May 2, 1961  C. P. LILJENGREN  2,982,342
CUSHIONED SEAT AND ELEMENTS THEREOF
Filed Feb. 8, 1957  8 Sheets-Sheet 1
Fig. 1.
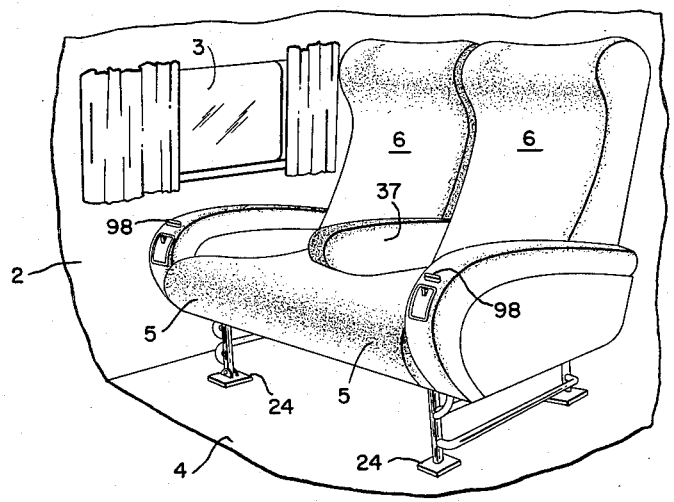
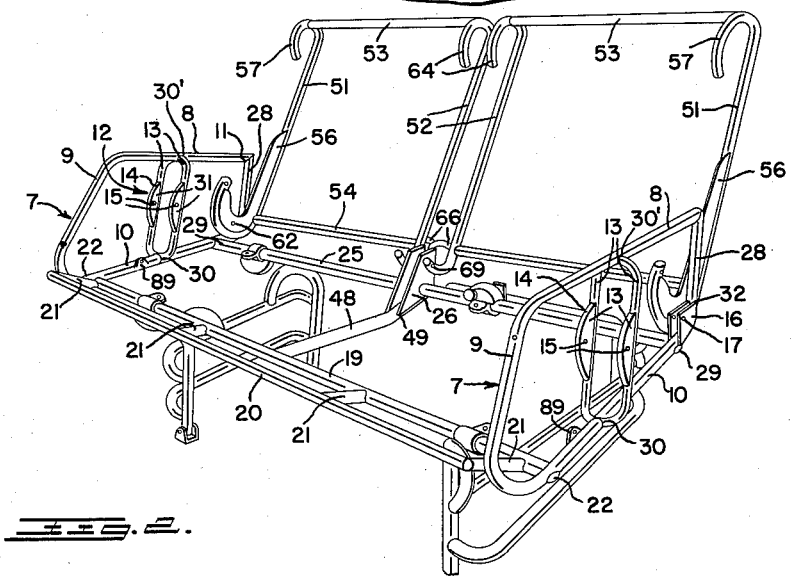
Fig. 2.
INVENTOR
CURTIS P. LILJENGREN
BY Albert H. Kichner
ATTORNEY

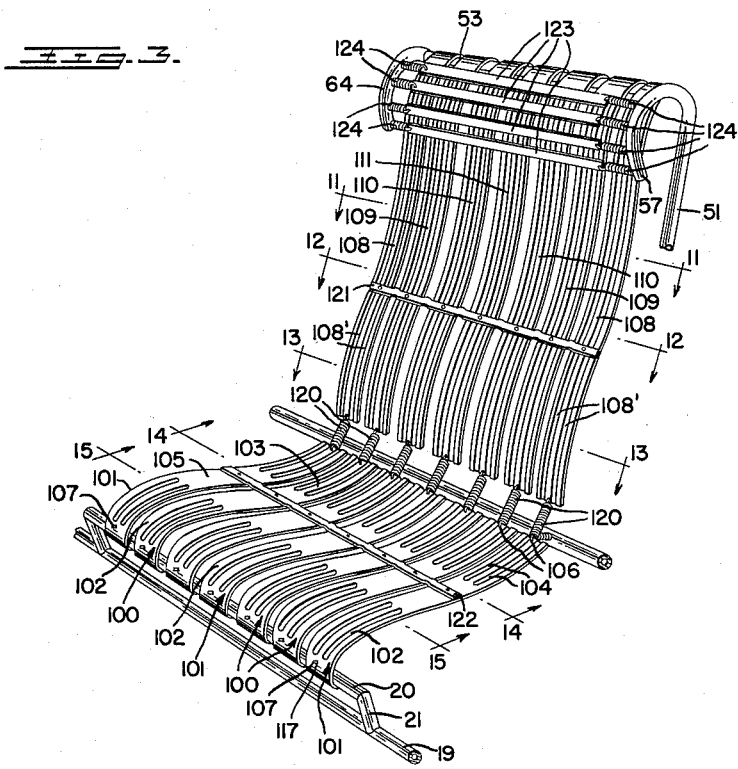

May 2, 1961  C. P. LILJENGREN  2,982,342
CUSHIONED SEAT AND ELEMENTS THEREOF
Filed Feb. 8, 1957  8 Sheets-Sheet 3
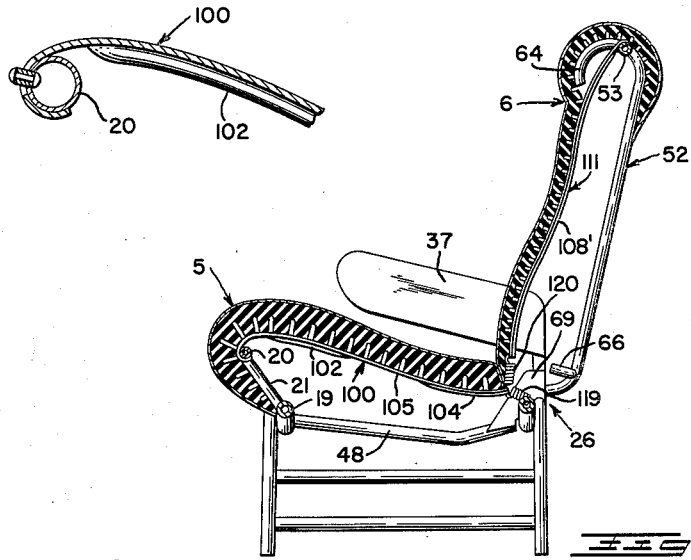
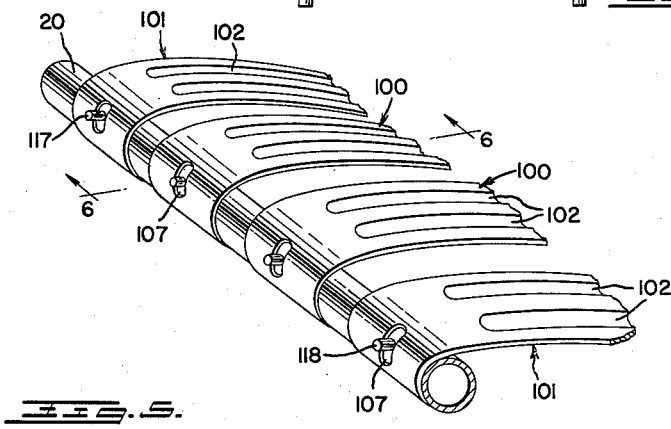
INVENTOR
CURTIS P. LILENGREN
BY *Albert H. Kirchner*
ATTORNEY

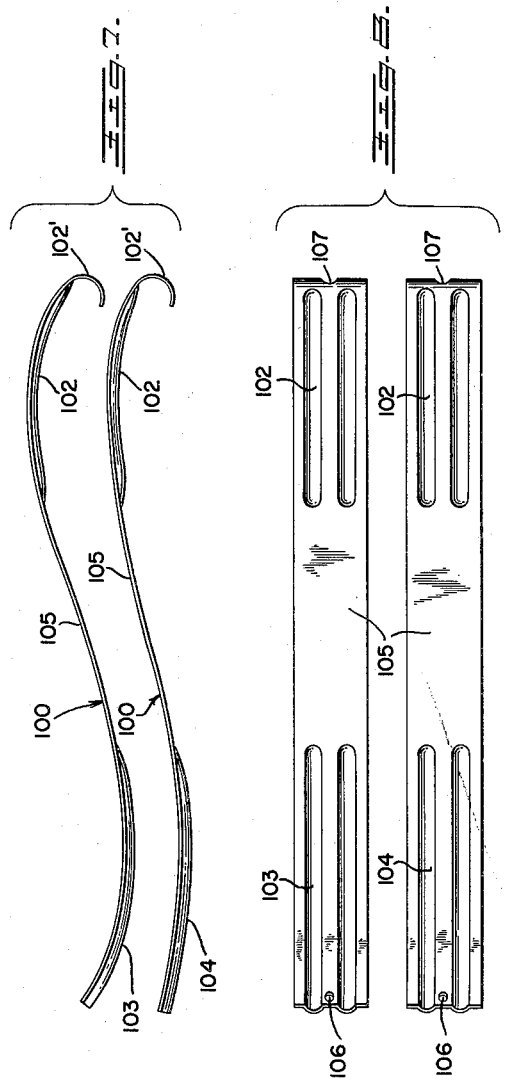

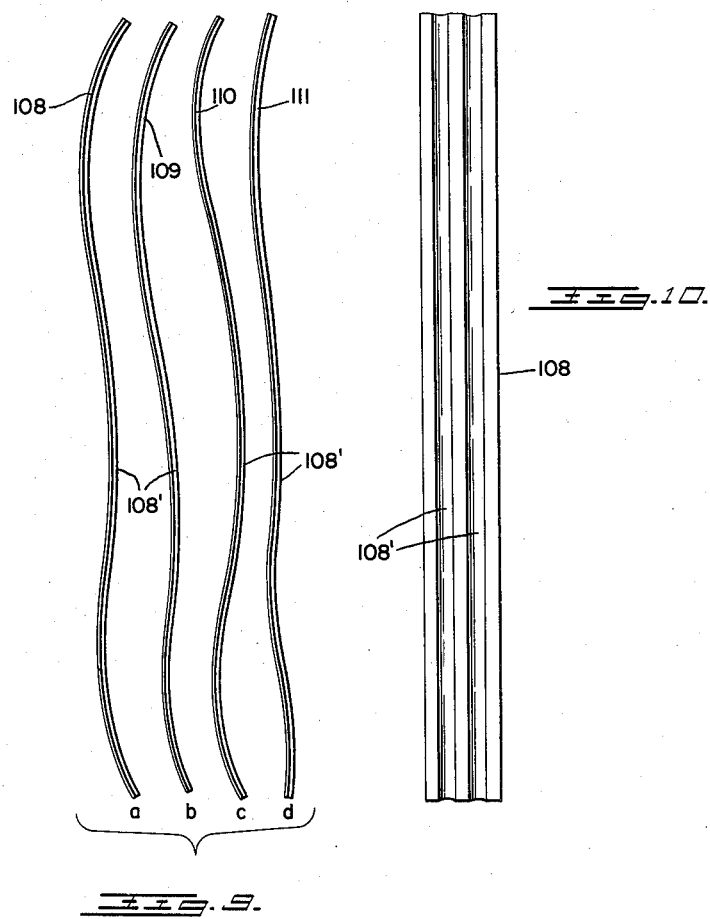

May 2, 1961

C. P. LILJENGREN 2,982,342

CUSHIONED SEAT AND ELEMENTS THEREOF

Filed Feb. 8, 1957

INVENTOR
CURTIS P. LILJENGREN

BY

ATTORNEY

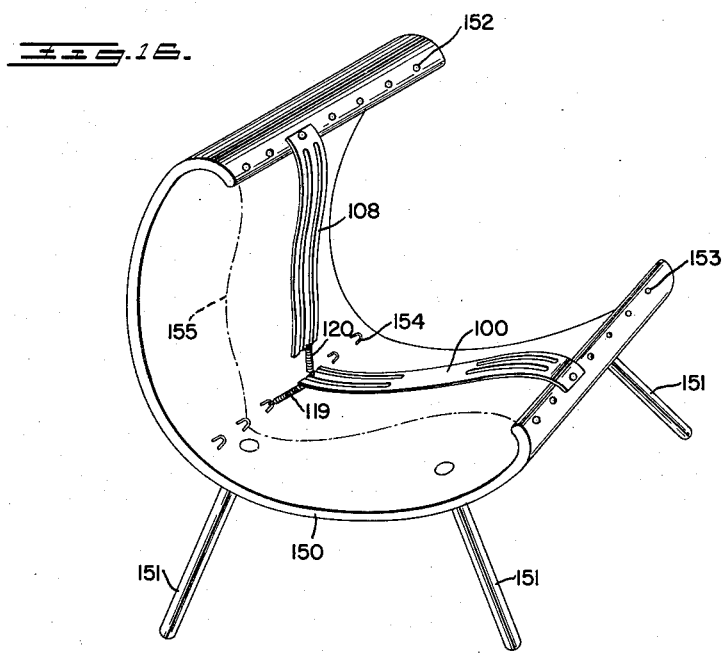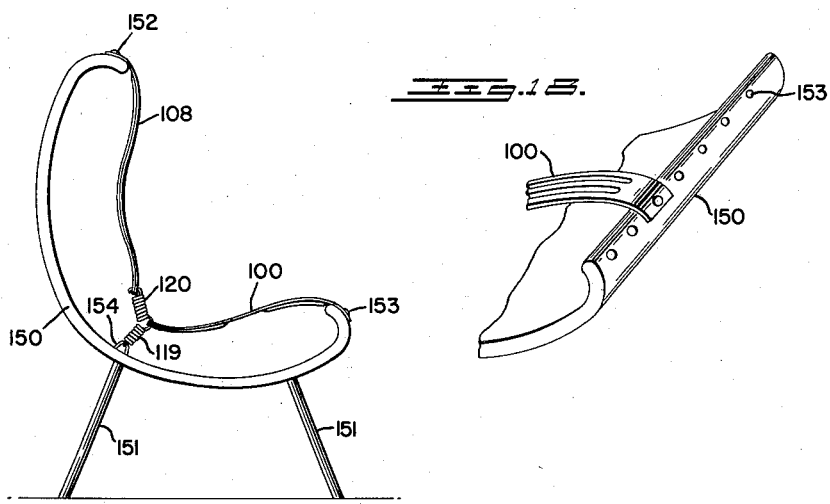

May 2, 1961 C. P. LILJENGREN 2,982,342
CUSHIONED SEAT AND ELEMENTS THEREOF
Filed Feb. 8, 1957 8 Sheets-Sheet 8
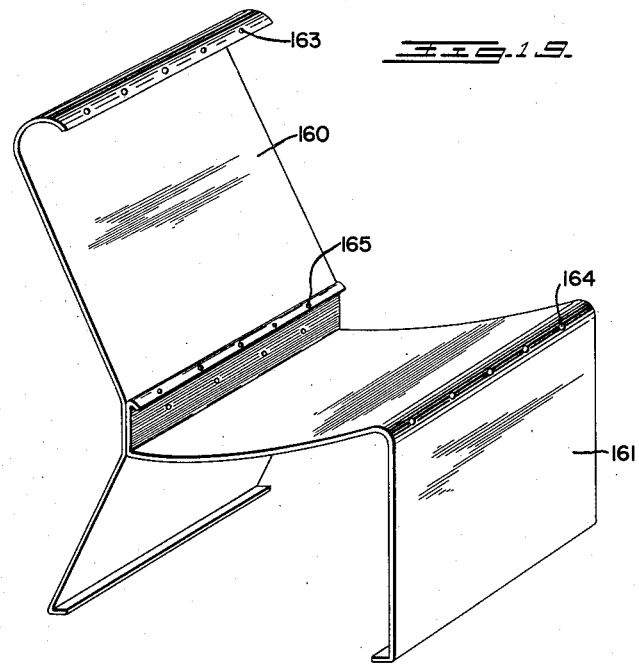
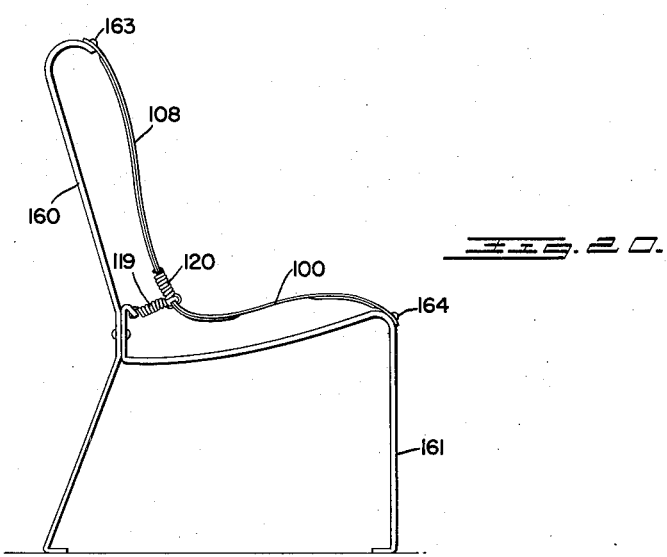
*INVENTOR*
CURTIS P. LILJENGREN
BY *Albert H. Kirchner*
ATTORNEY

United States Patent Office 2,982,342
Patented May 2, 1961

2,982,342

CUSHIONED SEAT AND ELEMENTS THEREOF

Curtis P. Liljengren, Miami, Fla. (621 Ashbury Ave., Santa Rosa, Calif.); Shirley S. Liljengren, sole legatee of said Curtis P. Liljengren, deceased Filed Feb. 8, 1957, Ser. No. 638,948

4 Claims. (Cl. 155—179)

The present application is a continuation in part of my copending application Serial No. 327,570, filed December 23, 1952, now U.S. Patent No. 2,802,518, and its purpose is to present claims directed to the cushion-forming metal strip members or elements per se which are disclosed and claimed in said copending application in combination with certain specific framing and supporting structure and to disclose new and different framing and supporting structure and accordingly to present claims directed to the combination of seat back cushion-forming metal strip members and seat bottom cushion-forming metal strip members cooperating as a seat-forming couple or subcombination which is independent of any particular framing and supporting structure.

The invention relates to chair or seat constructions, and its general object is to provide more comfortable and better body conforming seat and back-rest portions for such structures.

Another object is to provide back-rests and seat bottoms that are sufficiently flexible to be resiliently deformable to conform well to those portions of the occupant's body that are in contact with them and also to conform readily as the body may be shifted from time to time.

A further object is to provide a seat that has substantially more flexure in its longitudinal mid-portion than in its longitudinal edge portions, so that it will belly downward more freely in its middle than in its supported front and rear edge portions.

A further object is to provide a seat construction in accordance with the foregoing principles that minimizes the thickness requirements of the foam rubber or other covering commonly employed without loss of comfort but with substantial reduction in the weight of the covering as well as the backing structure.

With the foregoing and other objects in view, the invention, in one of its aspects, provides a pre-curved, resiliently deformable strip adapted to be assembled in multiple to form the skeleton or basic sub-structure of a seat bottom cushion or backrest cushion requiring only a covering layer of minimum thickness to complete it. The forward edges of the seat-forming strips may be mounted in any one of various ways on substantially any kind of frame or support, as by supporting them on a transverse support member such as a tube or rod which constitutes a part of the seat bottom frame, and the back-forming strips may be mounted by attaching their upper ends in any one of various ways to substantially any kind of frame or support. The seat-forming strips and the back-forming strips are held together at the juncture of their abutting free ends by axially stretchable means in the form of spring means, and the juncture in turn is tied resiliently to a transverse fixed back member or tube of the seat bottom frame to tie the juncture thereto for limited movement with respect thereto. The back strips preferably have different body-conforming curvatures, with the central strip having the greatest curvature, the outer strips the least, and the intermediate strips intermediate degrees of curvature. The strips are generally ox-bow in side contour. The seat strips preferably are S-shaped in side contour but more particularly they are designed to have more deforming flexiblity in their longitudinal mid-portion than at their end portions. Over the seat forming strips is secured a pad of soft material, such as foam rubber, and over the back-rest forming strips is secured another such pad. Suitable upholstery material is used to cover the surfaces of both cushion members.

In the framework of one type of back support, herein disclosed as illustrative but which forms no part of the invention herein claimed, there may be provided a pair of shepherd's crook-like elements, the outer one differing somewhat from the inner or center one. The pair of crook-like elements are rigidly joined together at their top and bottom by a pair of cross bars or rods, the top bar providing means to which the upper ends of the strips can be carried, and the upper curved ends of the crook-like elements providing means to which the ends of head-rest strips can be attached. Tapes or other binding straps may be secured to the back and under sides of the seat back and bottom strips, respectively, to limit their relative spreading action. The tapes are shown in the front of the strips in the drawings for the purpose of clarity of illustration.

In other forms of seat construction herein disclosed the framing or supporting structure assumes the form of a rigid shell or pan, or a rigid assembly of shells or pans, providing simply three lines of suspension, disposed at proper height, for attachment of the seat bottom-forming strips and the seat back-forming strips and the resilient means joining the adjacent ends of these strips, which strips, and the couples in which they are combined (a seat bottom-forming strip and a connected seat back-forming strip), it is to be understood, constitute the invention which is claimed in this application.

More specific details of the invention and of structures in which it may be used are described hereinafter.

The invention is illustrated in certain preferred forms of embodiment in the accompanying drawings in which Figure 1 is a perspective view of a twin seat unit disposed in open operative position in the cabin of an airplane;

Fig. 2 is a perspective view of one form of seat unit framework;

Fig. 3 is a detail perspective view showing the cushion-forming strips coupled together and installed on the seat framing structure of Fig. 2;

Fig. 4 is a longitudinal vertical sectional view through one of the seats of the unit, looking toward the center armrest;

Fig. 5 is a detail perspective view of the front edge of the seat bottom showing a form of attachment of the seat bottom support strips;

Fig. 6 is a detail sectional view taken substantially along the plane of line 6—6 of Fig. 5;

Fig. 7 is an end elevational view showing the preferred differential contours of a pair of seat bottom support strips;

Fig. 8 is a top plan view of the pair of seat bottom support strips shown in Fig. 7;

Fig. 9 is an end elevational view showing the preferred differential contours of the various seat back support strips, strip *a* corresponding to the center back support strip of Fig. 3, while strips *b*, *c* and *d* correspond to the back support strips in order starting with the strip next adjacent either side of the center strip and continuing to the outermost strip at either side;

Fig. 10 is a front elevational view of the seat back support strip showing a preferred form for retaining the contour of the strip;

Figure 11:
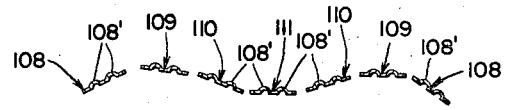
Figure 12:
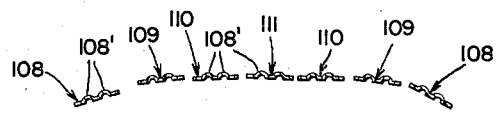
Figure 13:
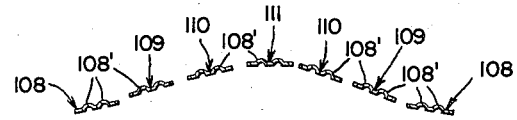
Figure 14:
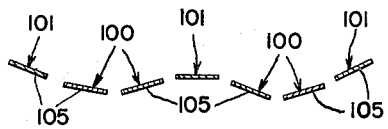
Figure 15:
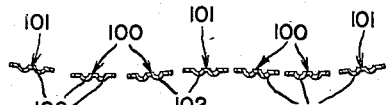

Figs. 11 through 13 are horizontal transverse sectional views taken substantially along the planes of lines 11—11, 12—12, and 13—13, respectively, in Fig. 3;

Figs. 14 and 15 are vertical transverse sectional views taken substantially along the planes of lines 14—14 and 15—15, respectively, in Fig. 3;

Fig. 16 is a perspective view, largely diagrammatic, showing a cushion strip couple installed in a chair framing structure of modified form;

Fig. 17 is a side elevational view of the structure shown in Fig. 16;

Fig. 18 is a perspective view showing a detail of one manner of connecting the front ends of the seat bottom-forming strips of Figs. 16 and 17 to the framing;

Fig. 19 is a perspective view, largely diagrammatic, showing a cushion strip couple installed in a chair framing structure of still further modified form; and Fig. 20 is a side elevational view of the structure shown in Fig. 19.

Referring to the drawings, and keeping in mind that while as shown, a twin seat unit is disclosed, the principles of the invention are equally capable of being embodied in a single seat unit for use as a piece of furniture or for passenger seating in a bus, railroad car, airplane or other vehicle, or in a unit composed of more than two seats, Figure 1 shows a twin seat installed in an airplane cabin having a floor 1 and a side wall 2, which has a window 3. The aisle area is designated generally 4, and the seat construction incorporating the strips of the present invention is installed between the side wall and the aisle area, being attached to the floor by means of plates designated 24. The seat base mounts a seat bottom cushion generally designated 5, connected to the supporting frame in a suitable manner and has a back cushion member generally designated 6 which in the illustrated embodiment is adjustable to various reclining angles under control of the recline rock mechanism hereinafter described.

An acceptable framing structure for the twin seat unit shown here is best disclosed in Fig. 2. In this embodiment the structure is composed of light gauge, high strength steel tubing. Primary structural members may be made from three-quarter inch diameter tubing with secondary structural members made from five-eighth inch diameter or smaller tubing. Of course these dimensions may be varied as desired. The seat frame structure includes a side armrest frame generally designated 7, which includes an endless element having a nearly horizontal upper support member or bar 8 which is bent diagonally downwardly and forwardly at its front end to form the front support member 9. This member connects with the horizontal portions 10, and the upright portion 28 connects the aft ends of bars or rods 8 and 10. The rod or bar stock has its ends secured together at 11 by suitable means such as welding. A recline lock mechanism support structure 12 is attached near the mid-point of the side framing structure 7 and consists essentially of a small diameter tube 13 bent in the shape of an elongated loop with its major axis at or near vertical and with its minor axis perpendicular to the plane of the side frame structure 7. Attachment of the loop 13 to the side frame structure 7 is made at 30, while the open ends of the loop 13 are secured to the bar 8 at 30'. A pair of relatively thin metallic plates 14 are attached to the legs of the loop 13 by welding at 31. Aligned holes parallel to the minor axis of the loop are drilled through the plates 14 to provide bearing housings in which are received through-welded bushings 15. Inboard backrest pivot support housing 16, formed from light gauge steel, is welded at the intersection of tube 10 with the portion 28, as shown at 32. The support housing 16 has aligned openings therethrough which have a through-welded bushing 17 extending therethrough, the axis of bushing 17 being parallel with the axis of bushings 15. Since the side frame structures at both sides of the chair are alike, a description of one will serve for both. The side frame structures 7 thus provided are held in laterally spaced relation by a front cross bar or rod 19 and a rear cross bar or rod 25 welded to the side fames 7 at 22 and 29 respectively. A transverse tube 20 is held in parallel spaced relation to the member 19 by four struts 21. The rear cross bar 25 includes a center armrest socket 26 attached at its midpoint. A fore and aft spreader tube 48 is welded to socket 26 at 49 and welded to tube 19 at their intersection. This completes the main seat base frame.

Each seat back 50 includes an outer side support member 51 and an inner side support member 52, both of which are shepherd's crook-like in form, connected by a top cross member in the form of a bar or rod 53 and by a bottom cross member in the form of a bar or rod 54.

The seat back frames are pivotally connected to the main seat frame structure at the center by pivot bolt 69, as shown in Fig. 2, and at the outer sides by a pivot bolt installed through pivot bushing 17, the latter bolt operating through pivot bushing 62 in the seat-back outer side support member 51. Construction details of the seat bottom support member are best shown in Fig. 7 and and Fig. 8, and will now be described.

In the preferred embodiment illustrated, the seat-forming strip members are made of thin, resilient sheet metal such as 24ST aluminum alloy of 0.032 inch thickness and approximately two inches wide, but these dimensions are suggested by way of example merely. The seat bottom forming strips are generally S-shaped in side contour, as shown in Fig. 7. They are particularly designed to have greater flexibility in their longitudinal mid-portion than at their end portions. Two strips designated generally 100 and 101 illustrate preferred shapes. It will be especially noted that the like end portions are reversely curved as shown at 102'. One preferred method of permanently deforming or contouring the strips consists of impressing two parallel beads or ribs approximately one-quarter inch wide and three-sixteenths inch deep into the thin metal.

Thus the forward sections designated 102 and the aft portions designated 103 and 104 will continue to hold their contoured forms with the same degree of flexibility, while the mid-portions 105 remain completely flexible. Beading in the forward portions 102 serves to equalize the unit loading on the forward portion of the seat bottom cushion, while beading in the aft portions 103 and 104 serves to prevent a hammock-like effect by always maintaining a certain angle of juncture between the seat-forming and back-forming strips to fit perfectly the posterior of the seat occupant. As the occupant changes his position, the flexible mid-portion 105 is free to adjust itself to the new contour required. Moreover, damage to the beaded portions by a person standing upon the seat bottom supports is eliminated since flexing is taken in the flexible mid-portions of the strips. Since the seat is composed of a plurality or group of strips, each individual strip may be contoured as necessary to provide a crosswise change in contour. Holes 106 provided near the aft ends of the strips and elongated holes 107 near the front edge portions of the strips may be provided for mounting the strips on the seat frame, as hereinafter explained.

A back support strip, as shown in Fig. 10, contains two parallel beads or channels extending throughout its entire length. Each one of the plurality or group of back-support or back-forming strips has a different contour in order to achieve varying crosswise as well as varying vertical contour for the back support assembly. Where a group of vertical strips is utilized, as shown in Fig. 3, the shape of the two outermost strips *a* may be represented by the shape designated 108 in Fig. 9. The two strips *b* adjacent the outermost strips just described may be represented by the shape designated 109. The strip *c* represents the shape of the two strips 110 adjacent the center strips, while the strip d may represent the shape of the center strip 111.

Figs. 11 through 15 are representative cross-section views taken on the planes 11—11 through 15—15, respectively, in Fig. 3 further illustrating this principle.

One preferred method of attaching the contour strips to the seat and back frames is shown in Figs. 3, 4, 5 and 6, and may be explained as follows:

The forward portion of each seat strip is rolled about the cross tube 20; and to withstand large down-loads a spacer pin 118, such as a rivet, is fastened through a hole in the front member 20. The seat support strip generally designated 100 is snapped on over the member 20 with the spacer pin 118 in register with the elongated hole or slot designated 107. Thus rotation of strip 100 on frame member 20 is restricted by slot 107. The aft portion of the strip 100 is supported by a tension spring 119 inserted in openings 106 in strip 100 and into holes in the rear frame member 25. The back support strips may be riveted to the top cross member 53 of the back or otherwise secured, and the back strips are suspended by means of tension springs 120 engaged in the holes 106 in corresponding seat bottom strips.

Thus individually suspended, the seat back and seat bottom strips are each capable of individual movement as required to conform to the individual occupant's anatomical and sitting position requirements. Furthermore, the occupant has no bodily contact with any rigid structural members aft or above his knee area and the back support strips and the seat bottom strips are restricted from undue separation between strips by the addition of suitable flexible cloth webbing or tape designated 121 and 122, respectively, which is attached to the back side of the individual contour strips by any suitable means, such as riveting. The attachment is shown in the drawings on the top or front sides of the strips, in order more clearly to show the arrangement.

A yieldable self-contouring headrest is formed at the top of the back by attaching light resilient metal straps 123 such as aluminum to the shepherd's crooks at 57 and 64 by means of tension springs 124. Suitable padding such as foam rubber or other soft rubber is disposed over the shepherd's crooks and serves to cushion the rigid members and provide "wings" or "ears" on the headrest so as to hold the occupant's head comfortably near the center of the headrest (see Figs. 1 and 4). The spring-loaded headrest could be used with many types of seat construction but its use in combination with the particular type of cushion suspension herein shown is advantageous. The headrest will adjust itself vertically to some extent to conform to the sitter's height. Furthermore, the particular construction of the seat bottom and seat back allows the taller, and hence usually heavier, occupant to sit lower in the seat. Thus the headrest unit and the cushion units cooperate to provide good head support for occupants of practically any build.

It is to be noted that in covering the chair foam rubber or equivalent padding can be employed and suitable upholstery fabric used to trim the same. Whereas heretofore the seat back supports have required as much as three to four inches, and the seat bottom supports have required as much as four to five inches of foam rubber padding, with the strips of the present invention and their straight line connection, deformation is not transferred from one seat bottom strip to its corresponding seat back strip, and the individual strips conform to the requirements of the individual occupant, thus resulting in reduced padding requirements. For example, the seat back support requires only one inch and the seat bottom support only one and one-half inch of foam rubber. This of course lessens the cost of manufacture and reduces weight. The use of aluminum in the framing with the constructions shown further results in reduction of weight without loss of strength or rigidity.

Figs. 16–20 show modified forms of chair framing or support structure illustrating how the strips, both seat bottom and seat back, can be mounted and connected to provide an entirely practical, operative couple without reliance or dependence on any feature of the base framing construction hereinabove described except the utilization of a line of support for the upper ends of the back cushion strips, a line of support for the front ends of the bottom cushion strips, and a line of support for the spring-connected lower ends of the back cushion strips and the rear ends of the bottom cushion strips.

In Fig. 16, the reference numeral 150 designates a rigid framing or supporting structure, which may be a sheet of plywood, or even of sheet metal, preformed into the curved shape shown and supported in any convenient manner, as by four legs 151. This preformed shell presents an upper support line 152 and a lower support line 153 for attachment of the free ends of the members of a plurality of seat cushion forming couples each comprising a seat bottom-forming member 100 and a seat back-forming member 108, made respectively of resilient sheet metal preformed strips as heretofore explained. The framing shell 150 also provides a support line 154 intermediate the lines 152 and 153 for affixation of the spring means 119 connected to the couples of strip elements adjacent the connecting springs 120 by which the adjacent or juxtaposed ends of the two strips of each couple are attached to each other. It will be understood that, while for clarity of illustration only one couple has been shown in Fig. 16, in actual practice a plurality of couples are mounted side by side in the arrangement shown in Fig. 3. Fig. 16 is included in this disclosure merely to illustrate a kind of base or supporting framing structure different from that of Figs. 2, etc., and to show how the strip means are useful with any kind of base providing support lines for attachment of the strip ends and spring connecting means.

Of course, suitable upholstery or equivalent surfacing material will be used to trim the seat cushion forming strips of Fig. 16, as indicated at 155.

Figs. 17 and 18 show the Fig. 16 construction in side elevation and perspective detail.

Figs. 19 and 20 illustrates a still further modified form of seat framing or supporting structure in which the cushion-forming strips may be mounted. In this construction a fixed back and base are formed of rigid pans 160, 161, respectively, secured together at the juncture of the rear edge of the base pan 161 and the lower edge of the back pan 160 which may, as in the illustrated style, be continued integrally downward to provide a supporting leg portion of the one-piece back. A support line 163 is provided at the top of the back pan for receiving the upper ends of the back-forming strips 108, and a similar support line 164 is provided at the front of the bottom pan 161 for affixation of the front ends of the bottom-forming strips 100. A support line 165 is provided in the region of the junction of the two pans for attachment of the springs 119 which are connected to the strips along the zone at which they are connected by the springs 120, as in the other, previously described embodiments. In Fig. 19 the strip means have been omitted for clarity of illustration, and Figs. 19 and 20 are largely diagrammatic but believed adequate to show the versatility of the strip means by which the strips, and more particularly the couples into which they are assembled, can be mounted in supports of widely diversified forms.

As the invention may be embodied in several forms without departing from the spirit or essential characteristics thereof, the presently disclosed embodiments are to be regarded as illustrative and not restrictive. The scope of the invention is defined by the broader of the appended claims rather than by the foregoing description, and all changes that fall within the scope of the claims or that are their functional as well as conjointly cooperative equivalents are to be deemed embraced by the claims.

I claim:

1. A seat cushion element comprising a strip of resilient sheet metal of substantially uniform thickness throughout its length having a downwardly curved forward end portion terminating in a downward hook for engagement over a seat base frame member and having an upwardly curved rear end portion integrally connected by a relatively flat intermediate portion, the upper surface of the strip being convex in its forward portion and concave in its rear portion and the strip having ribs formed in said forward and rear portions for rendering them less flexible than the intermediate portion of the strip, and the hook being formed with a lengthwise slot for receiving a pin on said seat base frame member to limit turning movement of the strip thereon.

2. In a chair, a back cushion element comprising a strip of resilient sheet metal having a preformed contour including a convex lower end portion and a convex upper end portion connected by a concave intermediate portion merging into said convex portions and having longitudinally extending beads formed therein to fix said preformed contour.

3. In a chair, a back cushion element comprising a strip of resilient sheet metal having a preformed contour including a convex lower end portion and a convex upper end portion connected by a concave intermediate portion merging into said convex portions and having end margins formed for attachment respectively to a framing support and to a seat bottom cushion element.

4. In a cushioned seat, the combination of a rigid frame, a seat bottom cushion assembly and a seat back cushion assembly, said seat bottom cushion assembly comprising a plurality of strips of resilient sheet metal of substantially uniform thickness throughout their lengths arranged generally horizontally side by side in spaced parallel relation and each having a preformed contour including a downwardly curved forward portion and an upwardly curved rear portion, the upper surface of each strip being convex in its forward portion and concave in its rear portion and the intermediate portion being substantially more flexible than the forward and rear portions and the end of the downwardly curved forward portion being fixed to the frame, said seat back cushion assembly comprising a plurality of strips of resilient sheet metal of substantially uniform thickness throughout their lengths arranged generally vertically side by side in spaced parallel relation and each having a preformed contour including a convex lower portion merging into a concave higher portion having its upper end fixed to the frame, the rear ends of the seat bottom cushion assembly strips being spaced forwardly from the lower ends of the seat back cushion assembly strips and being connected thereto by resiliently extensible spring elements, and other resiliently extensible spring elements connecting the rear ends of the seat bottom cushion assembly strips to the frame.

References Cited in the file of this patent

UNITED STATES PATENTS

| | | |
|---|---|---|
| 1,324,440 | Ackerman | Dec. 9, 1919 |
| 1,513,726 | Lamplugh | Oct. 28, 1924 |
| 1,535,803 | Benjamin | Apr. 28, 1925 |
| 2,034,078 | Ball | Mar. 17, 1936 |
| 2,302,479 | Tallmadge | Nov. 17, 1942 |
| 2,815,797 | Flint | Dec. 10, 1957 |
| 2,829,706 | Markle | Apr. 8, 1958 |

FOREIGN PATENTS

| | | |
|---|---|---|
| 102,728 | Great Britain | Dec. 11, 1916 |
| 550,624 | Great Britain | Jan. 18, 1943 |